United States Patent
Plichta

[15] 3,673,425
[45] June 27, 1972

[54] DIRECTIONAL CURRENT RELAY

[72] Inventor: Michael J. Plichta, Milwaukee, Wis.

[73] Assignee: McGraw-Edison Company, Elgin, Ill.

[22] Filed: Sept. 1, 1971

[21] Appl. No.: 176,912

[52] U.S. Cl. .................................307/127, 317/DIG. 1
[51] Int. Cl. ...........................................H02h 3/18
[58] Field of Search.................307/127, 130, 131, 126, 125, 307/236; 317/DIG. 1, 46; 328/118

[56] References Cited

UNITED STATES PATENTS

| | | | |
|---|---|---|---|
| 3,539,868 | 11/1970 | Stevenson | 307/127 X |
| 3,633,072 | 1/1972 | Duncan | 307/127 X |

Primary Examiner—Robert K. Schaefer
Assistant Examiner—William J. Smith
Attorney—Richard C. Ruppin

[57] ABSTRACT

A current direction indicator including control means for performing a predetermined operation in a poly-phase electrical power system independently of the magnitude of current flow in the polyphase system. A separate current direction indicating circuit is provided for each phase and includes a first circuit for producing a signal in response to a change in polarity of current in one of the phases of the system, a second circuit for producing a signal functionally related to the polarity of the voltage between two of the phases of the system and a third circuit which produces an output signal when both signals of the first and second circuits occur simultaneously. The control means operates in response to the output signal to initiate the predetermined operation in the system.

14 Claims, 8 Drawing Figures

Inventor:
Michael J. Plichta
By Richard C. Ruppin
Atty.

DIRECTIONAL CURRENT RELAY

BACKGROUND OF THE INVENTION

This invention relates to a current direction indicator for an alternating current power system.

In loop distribution power systems, circuit breakers are generally arranged, and relay control is provided so that a fault occurring in any part of the loop may be sectionalized and the load beyond the fault may be fed from the source or sources through a part of the loop connected around the fault. It is common in such loop systems to place a normally open reclosing circuit breaker at the assumed zero load center of the loop. When the relay circuitry of this tie reclosing circuit breaker senses a loss of voltage on either side of itself, it closes to provide a feed path through the unfaulted portion of the loop to the portion of the loop between the fault and the tie reclosing circuit breaker. The circuit breaker closest to the fault between the tie recloser and the fault will then sense overcurrent in the reverse direction feeding the fault and open in response to the reverse power flow to the fault. Since shortly after occurrence of the fault, a circuit breaker on the source side of the fault opened, the fault is now isolated and the system beyond the fault is being fed through the tie recloser. In order to accomplish this type of sectionalizing, the relay circuitry of each circuit breaker must include a first directional relay which is operative in response only to a forward fault overcurrent to initiate opening of the circuit breaker and a second directional relay which is operative in response only to a lower level of fault overcurrent in the reverse direction to initiate opening of the circuit breaker. This type system thus requires two directional relays for each circuit breaker and also requires a considerable length of time to close first the tie reclosing circuit breaker and then trip the sectionalizing circuit breaker closest to the fault on the tie reclosing circuit breaker side of the fault.

It is accordingly a general object of the invention to provide a current direction indicating means which is responsive only to current direction in an alternating current power system and is independent of the magnitude of the current flow to perform a predetermined operation in the system. The invention includes a first circuit for producing a first signal in response to the change in polarity of either the current or voltage in a phase of the system, a second circuit for producing a second signal when the other one of the current and voltage quantities has a predetermined polarity, and a third circuit which is responsive to the first and second signals to produce an output signal. The output signal is applied to a control means and in response thereto the control means performs or initiates a desired operation in the system such as changing a circuit breaker operating circuit so that it will respond to a lower level of current in the system.

PREFERRED EMBODIMENT OF THE INVENTION

Figure 1:
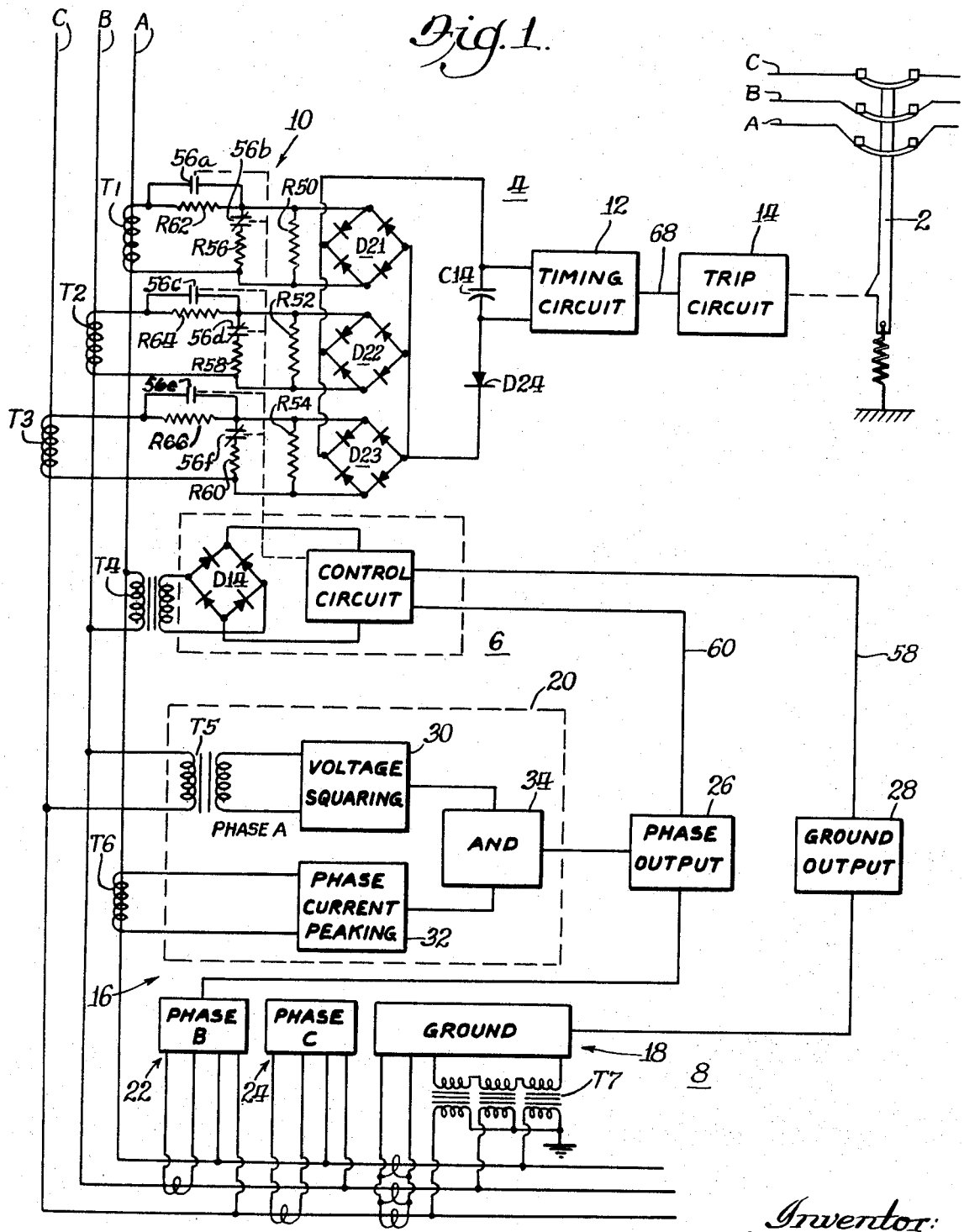
FIG. 1 illustrates a circuit breaker incorporating the current direction indicator of the instant invention.
Figure 2:
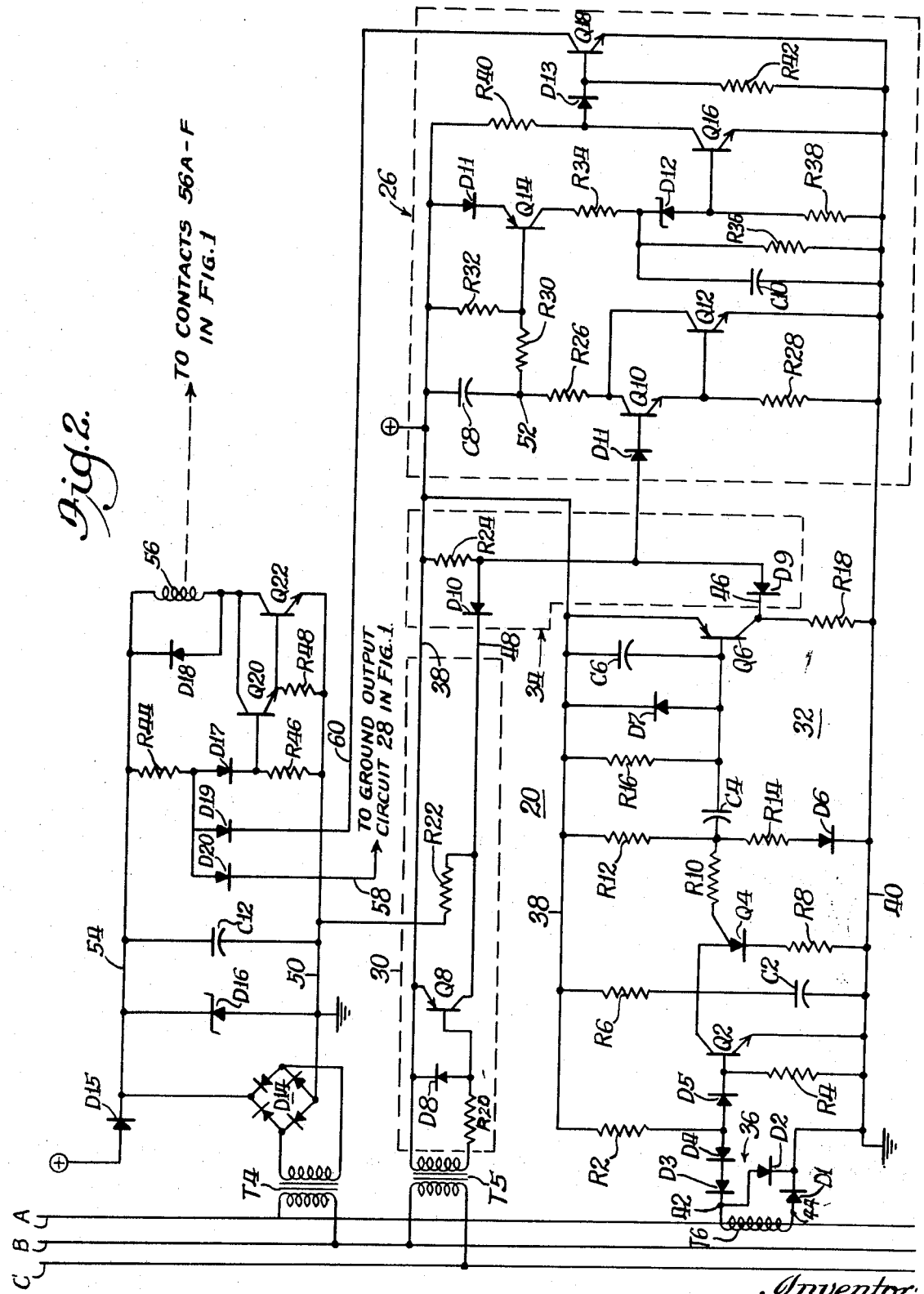
FIG. 2 illustrates the preferred embodiment of the invention.

Referring generally to the drawings, FIG. 1 shows a three phase circuit breaker incorporating a preferred embodiment of the instant invention and including circuit breaker switch 2 for interrupting voltage and the flow of current in a three phase system ABC. The current breaker includes an operating circuit 4, a control circuit 6 and a current direction indicating circuit 8. The operating circuit 4 includes an overcurrent sensing circuit 10, a timing circuit 12 and a trip circuit 14. The current direction indicating circuit 8 includes phase current direction indicating means 16 and ground current direction indicating means 18. Where there are three phases, as in the present case, each phase has a separate directional circuit 20, 22, and 24. A common phase output circuit 26 is provided for the three directional circuits 20, 22 and 24 of means 16, and a separate ground output circuit 28 is provided for the ground current direction indicating means 18. The phase A directional circuit 20 is shown in FIG. 2 as including a voltage squaring circuit 30, a phase current peaking circuit 32 and an AND gate circuit 34. The circuits 30 and 32 of any one of the directional circuits 20, 22 and 24 may be uncoupled from their associated phase A, B or C, for example by removal of the line connections of transformers T5 and T6, without affecting the signals produced by the circuits 30 and 32 associated with the remaining coupled phases or the protection provided to these latter phases.

In the preferred embodiment of the invention, each of the phase directional circuits 20, 22 and 24 and the ground current directional indicating means 18 is similar in construction and operation except for the manner in which each is connected to the system ABC. Therefore, for the sake of brevity, only directional circuit 20 is illustrated in detail and will be discussed. In the detailed discussion of the current direction indicating circuit 8, the normal current direction in the alternating current system ABC is utilized as the reference current direction and this current direction is also considered to be the preferred and forward current direction. When the current flow is not in the normal direction, it is considered to be in the reverse or non-preferred direction.

Figure 3:
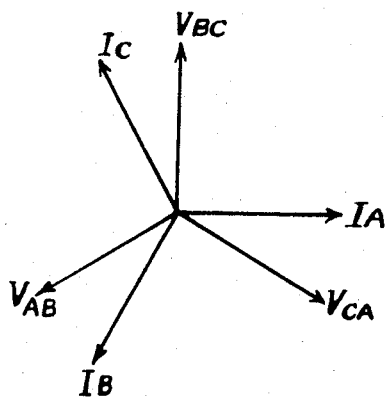
FIGS. 3, 4, and 5 are vector diagrams illustrating phase relationships of quantities utilized in the current direction indicator illustrated in FIGS. 1 and 2.
Figure 5:
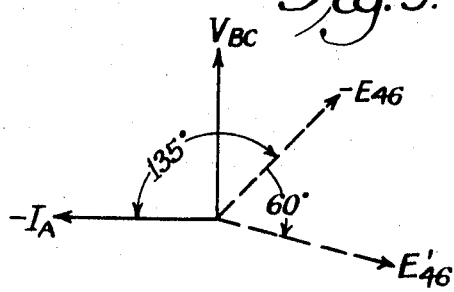

Reference is now made to FIG. 3 which shows the vector relationships between the line current and line-to-line voltages in the system ABC when current flow is in the preferred or forward direction and assuming a balanced load and unity power factor. It can be seen that the current $I_A$ in phase A lags the voltage $V_{BC}$ from phases B to C by 90°. When current flow in the system ABC is in the non-preferred or reverse direction, all of the current vectors $I_A$, $I_B$, and $I_C$, will be reverse 180° so that the current $I_A$ will lead the voltage $V_{BC}$ by 90°, as shown in FIG. 5. These vector relationships are employed by the current direction indicating circuit 8 for initiating a predetermined operation in the electrical power system ABC. In the present discussion, this predetermined operation is the modifying of current flow to the operating circuit 4 whereby the time at which trip circuit 14 operates is also changed or modified. Toward this end, the directional circuit 20 generates a first signal representative of current vector $I_A$ and a second signal representative of the voltage vector $V_{BC}$. If these two signals have a predetermined relation such as occurrence within a predetermined time period, a control function is initiated. It may be noted that the occurrence of the two signals and the initiation of the control function may be independent of the magnitude of the current in the system ABC.

The directional circuit 20 including the phase current peaking circuit 32 is shown in detail in FIG. 2. The circuit 32 is coupled to phase A by a current transformer $T_6$ and a half wave rectifying circuit 36 through diodes D3 and D4 and to the positive bus conductor 38 and negative bus conductor 40 by bias resistors R2 and R4. The collector of transistor Q2 is connected to the junction between resistor R6 and capacitor C2 which together comprise an RC time delay circuit connected across the conductors 38 and 40. The collector of transistor Q2 and the junction between resistor R6 and capacitor C2 are also connected to the anode of a programmable unijunction transistor Q4. The cathode of transistor Q4 is connected to the negative bus 40 through a resistor R8 and the gate of transistor Q4 is connected through a surge resistor R10 and a pulse shaping capacitor C4 to the base of an output transistor Q6. The gate of transistor Q4 is also connected through resistor R10 to a voltage divider comprising resistors R12, R14 and a temperature compensating diode D6. The base of output transistor Q6 is connected to the positive bus 38 through leakage resistor R16 and surge surpressing capacitor C6. A diode D7 is also connected between positive conductor 38 and the base of transistor Q6 to provide reverse biasing protection for transistor Q6. A load resistor R18 is connected between the collector of transistor Q6 and the negative of bus 40.

The input transistor Q2 is conductive when its base potential is positive relative to the negative potential connected to its emitter. When the transistor Q2 is conductive, the potential between the capacitor C2 and resistor R6 and at the anode of resistor Q4 is maintained close to the negative potential of conductor 40 so that capacitor C2 will not charge and transistor Q4 will be non-conductive. The voltage at the terminal 42 of current transformer T6 will follow the alternating wave form of current $I_A$ in phase A. When the potential at terminal 42 is positive relative to the potential at 44, current from positive bus 38 will not flow toward terminal 42 but instead will flow through diode D5 and resistor R4 to the negative bus 40 so that the base of transistor Q2 will have some potential value higher than the potential of conductor 40. This results in forward biasing and conducting of transistor Q2. When the potential at terminal 42 due to the current $I_A$ is negative relative to the potential at terminal 44, current from positive bus 38 will flow through resistor R2 and through diodes D4 and D3 toward terminal 42. This results in the potential at the base of transistor Q2 being hear the negative potential of conductor 40 so that transistor Q2 will not conduct. When transistor Q2 is non-conductive, the capacitor C2 charges to a level near that of positive bus 38. When the potential on capacitor C2 and thus the potential applied to the anode of transistor Q4 reaches a level which exceeds the potential on the gate of transistor Q4 as set by the voltage divider comprising resistors R12 and R14, transistor Q4 will conduct to discharge capacitor C2 through resistor R8. Also, when transistor Q4 conducts a pulse is generated at the gate of transistor Q4 which is applied through capacitor C4 to the base of output transistor Q6. This pulse turns output transistor Q6 on for a short time so that a positive pulse $E_{46}$ is produced on conductor 46 at the cathode of diode D9.

Figure 6A:
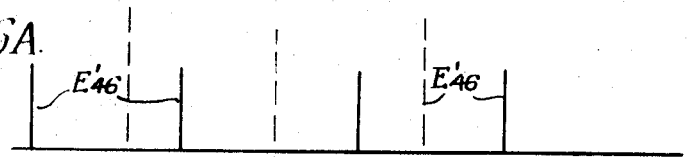
FIGS. 6A, 6B, and 6C graphically illustrate the interrelation between the signals generated by the current direction indicator shown in FIG. 2.
Figure 6B:
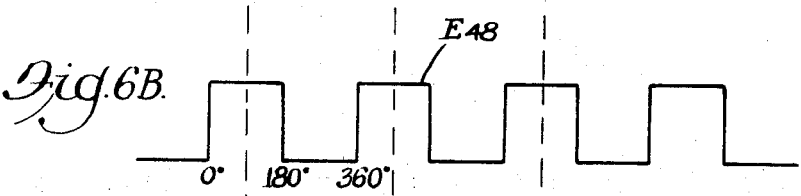

The voltage squaring circuit 30 is shown in detail in FIG. 2 and includes a switching transistor Q8 having its base connected to a potential transformer T5 through a resistor R20. A diode D8 is connected between the base and emitter of transistor Q8. The collector of transistor Q8 is connected to the negative bus 50 through resistor R22 and to the AND circuit 34 through conductor 48. When the junction between the resistor R20 and transformer T5 goes negative relative to the emitter of transistor Q8, the latter turns on to connect conductor 48 to the positive bus 38. On the other hand, when the junction between transformer D5 and resistor R20 swings positive, the transistor Q8 will be reverse biased by the drop across diode D8 so that it will not be conductive and conductor 48 will go to the negative potential of bus 50 due to the connection through R22. This produces the square wave form $E_{48}$ on conductor 48, as shown in FIG. 6B.

Figure 4:
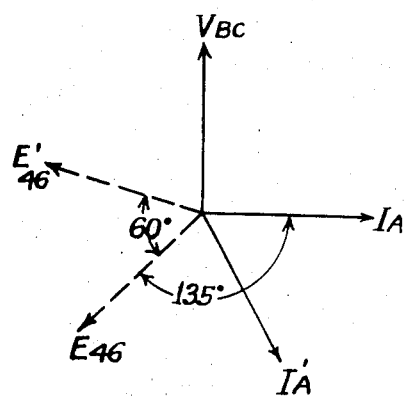

Referring again to the current peaking circuit 32, the voltage pulse $E_{46}$ appearing on conductor 46 represents the change in sense of polarity of the current flowing in phase A, but as a result of the time delay introduced by the capacitor C2, the voltage pulse $E_{46}$ is delayed. The voltage pulse $E_{46}$ is shown in FIG. 4 as lagging the current $I_A$ by 135°, however, the amount of lag may be adjusted by utilizing a capacitor or resistor of a different size. The pulse $E_{46}$ is not a phasor quantity and therefor it is represented in FIG. 4 by a broken line to indicate where it occurs in relation to the voltage $V_{BC}$ and the current $I_A$. The voltage pulse $E_{46}$ is shown in FIG. 6A to lead the position it is shown in FIG. 4 by 90° since $E_{46}$ is generated as $I_A$ passes through its zero point and not when $I_A$ is at its peak value. Thus, the voltage pulse $E_{46}$ occurs at a time when the square voltage wave $E_{48}$ is zero as shown in FIGS. 6A and 6B.

Figure 6C:
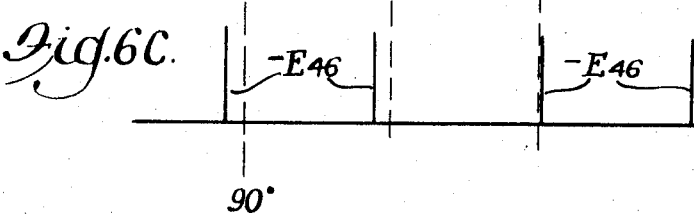

If the current in phase A reverses and flows in the non-preferred direction, the current vector $I_A$ leads the voltage $V_{BC}$ by 90°, as seen in FIG. 5. The voltage pulse $-E_{46}$ also lags the current $-I_A$ by 135° and therefore also lags the voltage $V_{BC}$ as shown in FIG. 5. The voltage pulse $-E_{46}$ is shown in FIG. 6C adjusted 90° for its generation as $-I_A$ passes through its zero point and occurs at a time when $E_{48}$ has a positive value, i.e., is present on conductor 40. If the current $-I_A$ in the reverse direction is a fault current in phase A, the voltage pulse now designated $-E'_{46}$ is delayed an additional 60° as shown in FIG. 5 for example. However, the pulse $-E'_{46}$ also occurs when voltage $E_{48}$ has a positive value, as shown in FIGS. 6B and 6C. Thus, since the voltage pulses $E_{46}$, the $-E'_{46}$ represent the voltage pulses on conductor 46, it may be seen that when current $I_A$ in phase A is in a forward direction the voltage pulse $E_{46}$ will not occur simultaneously with or within a predetermined time of the voltage $E_{48}$ but that the voltage pulses $-E_{46}$ and $-E'_{46}$ will occur at the same time as voltage $E_{48}$.

Referring again to FIG. 2, the AND gate circuit 34 comprises diodes D9 and D10 both having their anodes connected through a resistor R24 to the positive bus 38. The cathode of diode D9 is connected to the conductor 46 and therefore receives the voltage pulse applied to conductor 46. The cathode of diode D10 is connected to conductor 48 and therefore receives the voltage on conductor 48. The anodes of diodes D9 and D10 are also connected to the anode of input diode D11 in the phase output circuit 26. As those skilled in the art will appreciate, there will be no output from the AND gate circuit 34 through diode D11 unless both of the conductors 46 and 48 are connected to the positive bus 38. In other words, in order for an output from AND gate circuit 34, there must be a simultaneous output signal from the phase current peaking circuit 32 and the voltage squaring circuit 30 as shown by the voltage pulses $-E_{46}$ or $-E'_{46}$ and voltage $E_{48}$ in FIGS. 6C and 6B. As stated hereinabove, this occurs when there is current in the reverse direction in phase A.

The phase output circuit 26 includes an amplifier circuit comprising transistors Q10 and Q12. The collector of transistor Q10 is connected through resistor R26 to terminal 52 of capacitor C8, the other terminal of which is connected to the positive bus 38. The emitter of transistor Q10 is connected to the base of transistor Q12 and to the negative bus 40 through resistor R28. The collector of transistor Q12 is connected to the collector of transistor Q10 and its emitter is connected to the ground bus 40. The transistor Q14 has its base connected through resistor R30 to terminal 52 and to the positive bus 38 through leakage resistor R32. The emitter of transistor Q14 is connected to the positive bus 38 through diode D11 and the collector of transistor Q14 is connected through resistor R34 and the parallel combination of capacitor C10 and resistor R36 to the negative bus 40. The collector of transistor Q14 is also connected through resistor R34 and zener diode D12 to the base of transistor Q16. In addition, a leakage resistor R38 connects the base of transistor Q16 to negative bus 40. The collector of transistor Q16 is connected through the resistor R40 to the positive bus 38 and its emitter is connected directly to the negative bus 40. An output transistor Q18 has its base connected through the diode D13 to the junction between resistor R40 and the collector of transistor Q16 and to the negative bus 40 through leakage resistor R42.

The operation of the phase output circuit 26 is as follows. Output transistor Q18 is normally conductive and is turned off only after a signal is received at the base of transistor Q10. When the relatively short pulse from the AND gate circuit 34 is received at the base of transistor Q10, the pulse signal is amplified by the transistors Q10 and Q12. The amplified signal charges capacitor C8. When the charge on capacitor C8 reaches a predetermined value, the transistor Q14 is forward biased and conducts to complete a circuit through resistor R34 to the cathode of zener diode D12 and through capacitor C10 and resistor R36 to the negative bus 40. This signal is initially insufficient to break down zener diode D12, however, after a time delay determined by the charging time of capacitor C10 through R34, the breakdown voltage of zener diode D12 is reached and a conducting circuit is then completed through zener diode D12 and resistor R38 to the negative bus 40. The voltage on the base of transistor Q16 then rises to forward bias Q16 and it also conducts to complete a conducting circuit through resistor R40 to the negative bus 40. Conducting of transistor Q16 shunts the base of transistor Q18 which then turns off to thereby provide an output signal by interrupting the previously conductive circuit from the positive bus conductor 54 in control circuit 6 to the negative bus 40.

The control circuit 6 is also shown in detail in FIG. 2 and is coupled to the alternating current system ABC by means of potential transformer T4 and rectifying bridge D14. The positive bus conductor 54 of control circuit 6 is also coupled to a source of D.C. power (not shown) through diode D15 which serves to isolate the rippling output of bridge D14 from the power source. A zener diode D16 connected between the positive bus 54 and the negative bus 50 serves as a regulator for the output from the bridge D14. A capacitor C12 filters the output of the bridge D14 and also serves as an energy storage source for the control circuit 6. The base of a transistor Q20 is connected between a leakage resistor R46 and diode D17 and the series combination of resistor R46, diode D17, and bias resistor R44 are connected across the positive bus 54 and negative bus 50. A leakage resistor R48 is connected to the emitter of transistor Q20 and the base of Q22. The transistors Q20 and Q22 function as an amplifying circuit to provide an output signal through a relay coil 56. A discharge circuit through diode D18 for relay coil 56 is provided and FIG. 2 shows an operating connection from coil 56 which leads to contacts 56a–f in FIG. 1.

The transistors Q20 and Q22 are normally off and in this condition, the coil 56 is deenergized and the contacts 56a–f have their conditions shown in FIG. 1. The transistors Q20 and Q22 are in their normal off condition whenever the transistor Q18 in phase output circuit 26 is conducting or when a transistor corresponding to Q18 is conducting in the ground output circuit 28. A conductor 58 similar to conductor 60 is shown in FIG. 2 as leading to the ground output circuit 28. The conductor 58 is connected within circuit 28 to the transistor corresponding to Q18. When transistor Q18 is conductive, it provides a conductive circuit from the positive bus 54, through resistor R44 and diode D19 to the negative bus 40 to thereby shunt biasing current around the base of transistor Q20 so that transistor Q20 and therefore transistor Q22 remain off. Only if both transistor Q18 and the corresponding transistor in the ground output circuit 28 turn off will current flow through resistor R44, diode D17 and resistor R46 to forward bias Q20 and turn transistors Q20 and Q22 on. It may be appreciated that several variations of the control circuit 6 are possible. For example, the transistor Q18 and the corresponding transistor in ground output circuit 28 may be separately and independently connected to a transistor amplifying circuit such as transistors Q20 and Q22 which would independently provide different output signals to the coil 56. With such a circuit arrangement, either an output signal from phase output circuit 26 or an output signal from ground output circuit 28 would result in an output signal to relay coil 56. When an output signal is produced to relay coil 56, it switches the contacts 56a–f to their positions opposite from those shown in FIG. 1. As will be seen hereinafter, this switching and thus the current direction relay of the present invention changes the overcurrent level at which a time delay can be completed to permit opening of circuit breaker switch 2.

The operating circuit 4, as shown in FIG. 1, includes a timing circuit 12 and a trip circuit 14. The timing circuit 12 and trip circuit 14 are both coupled to the alternating current system ABC through current transformers T1, T2 and T3 and full wave rectifying bridges D21, D22 and D23. Resistors R50, R52, and R54 respectively connected in parallel with the bridge rectifiers D21, D22 and D23. Resistors R56, R58 and R60 are respectively connected in parallel with resistors R50, R52 and R54 through relay coil contacts 56b, 56d and 56f. In the normal condition of contacts 56b, 56d and 56f as shown in FIG. 1, the resistors R56, R58, and R60 are effectively in circuit with resistors R50, R52, and R54. Resistors R62 and R64, and R66 are respectively connected in series with bridge rectifiers D21, D22, and D23. Resistors R62, R64, and R66 are effectively out of circuit with resistors R50, R52, and R54 when the contacts 56a, 56c, and 56e are in their normally open conditions as shown in FIG. 1.

When the contacts 56a–f have the condition shown in FIG. 1, the secondary current of the current transformers T1–T3 will produce voltage drops which are divided between the various resistors for each phase. For example, considering phase A, when contact 56a is open and contact 56b is closed, resistors R50 and R56 will be effectively in parallel and resistor R62 will be effectively in series with the parallel combination of R50 and R56. The voltage drop generated by the secondary current of current transformer T1 will divide between resistor R62 and the parallel combination of R50 and R56. Because the effective resistance of parallel connected resistors is less than the resistance of each one of the resistors alone, the voltage drop across the parallel combination of R50 and R56 and therefore the voltage drop across capacitor C14 will be lower than the voltage drop across R50 alone. Also because the resistor R62 takes a portion of the total voltage drop, the drop on R50 is less than when R62 is shunted by contact 56a. Accordingly, when contacts 56a–f are in their conditions opposite from that shown in FIG. 1, the total voltage drop due to the secondary currents of transformers T1–3 will respectively appear across resistors R50, R52 and R54. Each one of these voltage drops will be larger than when the contacts 56a–f are in their condition shown in FIG. 1 for equal values of transformer currents. Thus, modifying of the current flow paths through resistors such as R50, R56, and R62 to vary the voltage drop appearing capacitor C14 changes the time delay provided by timing circuit 12 as will be discussed hereinafter.

The timing circuit 12 functions with the overcurrent sensing circuit 10 to provide a time delay which is inversely proportional to the magnitude of the current flowing in one of the phases A, B, or C. Both the timing circuit 12 and the trip circuit 14 are of types well known in the art and will be discussed only in general terms here. The capacitor C14 serves as a means of controlling the timing circuit 12 in accord with the current flowing in any of the phases, A, B, or C. The time delay provided by timing circuit 12 is determined by the voltage drop appearing across capacitor C14 and therefore by the magnitude of current flow in any one of the phases A, B, or C. At the end of the time delay provided by timing circuit 12 a signal is applied to the trip circuit 14 which, in turn, trips the main circuit breaker switch 2 so that it moves to its open position and interrupts conduction of phases A, B, and C. As previously discussed, the voltage drop appearing across capacitor C14 will be only a portion of the total voltage drop across the resistors of overcurrent sensing circuit 10 when the contacts 56a–f are in their conditions shown in FIG. 1. When the contacts 56a–f have their conditions opposite from that shown in FIG. 1, the voltage drop in capacitor C14 will be substantially all of the total voltage drop across the resistors of the overcurrent sensing circuit 10.

Thus, for equal values of current in the system ABC, the condition of the contacts 56a–f shown in FIG. 1 results in a relatively small voltage drop across capacitor C14 and when the contacts a–f have a condition opposite from that shown in FIG. 1 a larger voltage drop appears across capacitor C14. Since this voltage drop controls the length of the time delay provided by timing circuit 12, the time delay is in effect controlled by the direction of the current in any one of the phases A, B, or C as indicated by the phase current direction indicating means 16 or by the direction of ground current as indicated by ground current direction indicating means 18.

To summarize, when fault current occurs in the forward or preferred direction in phases A, B, or C voltage drop appears across one or more of the low resistance parallel combinations of resistors R50, and R56, R52 and R58, and R54 and R60 and also across capacitor C14. Due to the fact that forward fault currents are usually of a high magnitude, this voltage drop will nevertheless be substantial. Therefore, due to the inverse proportionality characteristic of timing circuit 12, the timing circuit 12 provides a relatively short time delay after which the trip circuit 14 is actuated to trip the circuit breaker switch 2 to its open position. In the event that current flow is in the non-preferred or reverse direction in any one of phases A, B, or C or in the ground connection of these three phases, one of the directional circuits 20, 22, 24 or ground current direction indicating means 18 will produce a signal indicative of the reverse flow direction of current. Using directional circuit 20 as being illustrative, this is accomplished by the simultaneous generation of a signal from voltage squaring circuit 30 and phase current peaking circuit 32 to AND circuit 34 which in turn produces a third signal to the phase output circuit 26. When the output transistor Q18 of phase output circuit 26 turns off and the corresponding output transistor of ground output circuit 28 also turns off, the control circuit 6 energizes its relay 56 which switches the contacts a–f to their conditions opposite from that shown in FIG. 1. The voltage drop then appearing across the capacitor C14 due to current flow in the non-preferred direction will still be substantial since only R50 is in parallel with C14, even though reverse fault current may be of a lower magnitude than forward fault current. Again, after the inversely proportional time delay of timing circuit 12, the circuit breaker switch 2 will be tripped open. Similarly, if the reverse overcurrent is of a high magnitude the time delay will be faster than either the usual reverse current time delay or the forward overcurrent time delay.

It is thus seen that a combined current direction indicating circuit and control circuit have been provided for modifying the time delay prior to interrupting of the alternating system ABC independently of the magnitude of current flow in the system ABC. Although the modification has been accomplished by changing the overcurrent sensing portion of the circuit operating circuit, the modification may also be accomplished by changing the timing capacitor arrangement normally included in time delay circuits such as illustrated herein.

Moreover, the disclosed current direction indicating means and control means may be utilized to perform other functions in the system ABC not involving the level of current flow in the system. Some of these include blocking of instantaneous trip of the circuit breaker switch, preventing reclosing of the circuit breaker switch after it opens, and indicating functions such as providing an alarm to a remotely located dispatch point.

It will also be appreciated by those skilled in the art that the current peaking circuit 32 and voltage squaring circuit 30 can be reversed relative to the system voltage and current so that current squaring and voltage peaking circuits are provided. Also, while the invention has been illustrated and described in relation to a poly-phase system, it could also be employed with a single phase system wherein only a single directional circuit would be employed.

Accordingly, while only a single embodiment of the instant invention has been shown and described, the scope of the invention is not to be limited to the disclosed specific embodiment.

I claim:

1. In an electrical power system for producing alternating polarity voltage and current quantities, the combination comprising:
   circuit means for performing a predetermined operation in said electrical power system;
   control means coupled to said circuit means and operative independently of the magnitude of said current and voltage quantities for controlling said operating circuit means; and
   a current direction indicator including:
     first circuit means coupled to said system for producing a first signal in response to the change in polarity of one of said quantities;
     second circuit means coupled to said system for producing a second signal when the other one of said quantities has a predetermined polarity; and
     third circuit means coupled to said first circuit means, said second circuit means and said control means and being responsive toe the occurrence of both of said signals during a predetermined time period to produce a third signal to the control means whereby the latter is actuated to control the operating circuit means.

2. The combination according to claim 1 wherein said control means comprises circuit means for modifying current flow to the operating circuit means.

3. The combination according to claim 2 wherein said operating circuit means comprise current level sensing means coupled to said control means and being responsive to said current flow for initiating interruption of the voltage and current quantities in said system, said level sensing means being operative after a time delay inversely proportional to the level of said current flow whereby said control means controls said time delay as a function of the current direction in said system.

4. The combination according to claim 1 wherein:
   said first circuit means includes a phase current circuit coupled to said system and producing said first signal in response to change in polarity of a phase current in said system, said first circuit means also including a ground current circuit coupled to said system and producing said first signal in response to change in polarity of ground current in said system;
   said second circuit means includes a phase-to-phase voltage circuit coupled to said system and producing said second signal when a phase-to-phase voltage in said system has said predetermined polarity, said second circuit means also including a phase-to-neutral voltage circuit coupled to said system and producing said second signal when the phase-to-neutral voltage has said predetermined polarity;
   said third circuit means includes output circuit means connected to said control means, said output circuit means producing said third signal in response to the occurrence during said predetermined time period of the first and second signals respectively from the phase current circuit and the phase-to-phase voltage circuit or in response to the occurrence during said predetermined time period of the first and second signals respectively from the ground current circuit and the phase-to-neutral voltage circuit.

5. In an electrical power system producing alternating polarity voltage and current quantities, a current direction indicator comprising:
   first circuit means coupled to said system and including a relaxation oscillator circuit for producing a first signal in response to a change in polarity of one of said quantities;
   second circuit means coupled to said system for producing a second signal when the other one of said quantities has a predetermined polarity; and
   third circuit means coupled to said first circuit means and said second circuit means and being responsive to the occurrence of both of said signals during a predetermined time period to produce a third signal indicative of current flow in said system in a predetermined direction.

6. The combination according to claim 5 wherein said first circuit means includes a current transformer coupled to said system and having a secondary winding producing an alternating polarity current to said relaxation oscillator circuit, the operation of said relaxation oscillator circuit being inhibited while said transformer current has a predetermined polarity.

7. The combination according to claim 6 wherein said relaxation oscillator circuit produces a fourth signal and comprises a three electrode static switch including an anode receiving said fourth signal, said static switch being conductive in response to receipt of the fourth signal at said anode.

8. The combination according to claim 6 further comprising control means coupled to the third circuit means and being operative independently of the magnitude of said current quantity for performing a predetermined modification to said electrical power system in response to said third signal.

9. The combination according to claim 7 further comprising:

time delay means having a controllable variable time delay period for delaying interruption of said electrical power system; and wherein said control means is operative to control said variable time delay period.

10. In an electrical power system producing an alternating polarity voltage quantity, a current quantity flowing in either of two opposite directions, and including a circuit breaker for interrupting said system, the combination comprising:

circuit breaker operating means including time delay circuit means for delaying operation of the circuit breaker, said time delay circuit means having two different conditions each corresponding to one of the opposite flow directions of the current quantity and having a variable time delay determined by said conditions;

first circuit means coupled to said system for producing a first signal in response to a change in polarity of one of said quantities;

second circuit means coupled to said system for producing a second signal when the other one of said quantities has a predetermined polarity; and third circuit means for sensing the occurrence of said first and second signals within a predetermined time period, the occurrence of said signals within said time period indicating a flow of said current quantity in one of said opposite directions, said third circuit means being responsive to the occurrence of said signals within said predetermined time period to operate the time delay circuit means from one of said conditions to the other of the conditions whereby said time delay period is varied.

11. The combination according to claim 10 wherein the third circuit means is responsive to the simultaneous occurrence of said first and second signals to operate the time delay circuit means from one of said conditions to the other.

12. The combination according to claim 10 wherein:

said circuit breaker operating means includes a current transformer coupled to said system and having a secondary winding producing current proportional to the current in said system;

the time delay of said time delay circuit means is inversely proportional to the magnitude of said secondary winding current, and the time delay circuit means has a different magnitude of secondary current flowing in it in each of said different conditions.

13. The combination according to claim 11 wherein said first circuit means includes:

a current transformer coupled to said system and having a secondary coil producing an alternating polarity current; and a relaxation oscillator circuit coupled to said secondary coil and operative signal in response to the alternating current from the secondary coil.

14. The combination according to claim 10 wherein:

said electrical power system comprises a three phase system;

said first circuit means produces a first signal for each one of said phases;

said second circuit means produces a second signal for each one of said phases;

said third circuit means is responsive to the occurrence of said first and second signals related to the same one of any of said three phases within said predetermined time period to operate the time delay circuit means from one of said conditions to the other of the conditions; and the coupling of said first and second circuit means to said three phases is removable from the same one of any of said phases, said first and second circuit means producing the first and second signals related to the remaining coupled phases to the third circuit means independently of the removal of the coupling of the first and second circuit means to the one phase.

* * * * *